(12) United States Patent
Keller et al.

(10) Patent No.: US 10,079,522 B2
(45) Date of Patent: Sep. 18, 2018

(54) ELECTRIC MACHINE HAVING A MOUNTING FLANGE

(71) Applicant: Robert Bosch GmbH, Stuttgart (DE)

(72) Inventors: Thomas Keller, Buehl (DE); Christian Bauer, Lauf (DE)

(73) Assignee: Robert Bosch GmbH, Stuttgart (DE)

(*) Notice: Subject to any disclaimer, the term of this patent is extended or adjusted under 35 U.S.C. 154(b) by 244 days.

(21) Appl. No.: 15/034,192

(22) PCT Filed: Oct. 24, 2014

(86) PCT No.: PCT/EP2014/072893
§ 371 (c)(1),
(2) Date: May 4, 2016

(87) PCT Pub. No.: WO2015/067487
PCT Pub. Date: May 14, 2015

(65) Prior Publication Data
US 2016/0294249 A1  Oct. 6, 2016

(30) Foreign Application Priority Data
Nov. 5, 2013 (DE) .......... 10 2013 222 402

(51) Int. Cl.
*H02K 5/00* (2006.01)
*H02K 5/26* (2006.01)
(Continued)

(52) U.S. Cl.
CPC .............. *H02K 5/26* (2013.01); *B23K 26/28* (2013.01); *H02K 5/00* (2013.01); *H02K 5/04* (2013.01);
(Continued)

(58) Field of Classification Search
CPC .. H02K 5/00; H02K 5/02; H02K 5/04; H02K 5/26
(Continued)

(56) References Cited

U.S. PATENT DOCUMENTS 5,786,647 A * 7/1998 Vollmer .................. H02K 5/24
                                                       310/51
5,883,451 A * 3/1999 Majchrzak ............ F04D 25/082
                                                       310/58
(Continued)

FOREIGN PATENT DOCUMENTS

CN     101080571 A    11/2007
DE     102004021537   12/2005
(Continued)

OTHER PUBLICATIONS

International Search Report for Application No. PCT/EP2014/072893 dated Jun. 16, 2015 (English Translation, 2 pages).

*Primary Examiner* — Hanh Nguyen
(74) *Attorney, Agent, or Firm* — Michael Best & Friedrich LLP

(57) ABSTRACT

The invention relates to an electric machine (12) having a mounting flange (10) and to a method for producing an electric machine (12) of this kind having a mounting flange (10) of this type. Said mounting flange is arranged on a—preferably cylindrical—housing part (14) of said electric machine (12) in such a way that the mounting flange (10) at least in portions surrounds the housing part (14) in the circumferential direction (16) of said housing part (14), the mounting flange (10) and/or the housing part (14) being coated. The invention is characterized in that the mounting flange (10) has an at least radially directed raised portion (18) abutting the housing part (14), the mounting flange (10) being mounted on the housing part (14) by a welding process.

22 Claims, 2 Drawing Sheets

(51) Int. Cl.
*H02K 5/04* (2006.01)
*B23K 26/28* (2014.01)
*H02K 15/14* (2006.01)
*B23K 101/36* (2006.01)

(52) U.S. Cl.
CPC .......... *H02K 15/14* (2013.01); *B23K 2201/36* (2013.01)

(58) Field of Classification Search
USPC .............................................. 310/89, 88, 91
See application file for complete search history.

(56) References Cited

U.S. PATENT DOCUMENTS

| | | | | |
|---|---|---|---|---|
| 6,262,504 B1* | 7/2001 | Bartlett | .............. | B60H 1/00521 310/58 |
| 6,448,678 B1* | 9/2002 | Simpson | ............... | F04D 29/668 310/51 |
| 2009/0058209 A1* | 3/2009 | Baranowski | ............. | H02K 5/24 310/91 |
| 2011/0169362 A1 | 7/2011 | Teimel | | |

FOREIGN PATENT DOCUMENTS

| | | |
|---|---|---|
| DE | 102008002288 | 12/2009 |
| EP | 2131473 | 12/2009 |

* cited by examiner

ELECTRIC MACHINE HAVING A MOUNTING FLANGE

BACKGROUND OF THE INVENTION

The invention is based on an electric machine having a welded-on mounting flange and also on a method for installing such a mounting flange on the electric machine.

Electric machines having a mounting flange are known, as are presented in DE 102008002288. In the case of this electric machine the mounting flange is installed on a housing part of the electric machine. Here, a bearing face extends in the axial direction and in the peripheral direction between the mounting flange and the housing part. The mounting flange is preferably mounted on the housing part by screwing, bonding or pressing. However, it is not possible to provide economical series production in this way, since complex additional processes and additional materials have to be provided. A mounting flange having such a bearing face is unsuitable for welding to the housing part, since gases produced during a welding process cannot escape without passing a melt of a weld seam. This process results in a reduction of the weld seam quality, which for example leads to the porosity of the weld seam. In particular, this deficient process occurs in the case of a coated mounting flange and/or housing part.

SUMMARY OF THE INVENTION

The device according to the invention has the advantage over the prior art that merely a raised portion abuts a housing part of the electric machine. A formation of a bearing face extending in the axial direction and peripheral direction is thus avoided, and a reliable welding of the mounting flange to the housing part is made possible. Here, the mounting flange is arranged on a (preferably cylindrical) housing part of the electric machine, such that the mounting flange at least in portions surrounds the housing part in the peripheral direction of the housing part. A reliable positioning of the mounting flange with little clearance can be achieved in this way. The mounting flange is advantageously mounted on the housing part by means of a welding process, such as laser welding, which ensures an economical series production. Furthermore, the mounting flange and/or the housing part are/is coated, which ensures a high protection against corrosion. However, the coating leads when welding to a reduced weld seam quality, since the coating tends toward gas formation under heating. In order to prevent this, a gap is formed by the raised portion between the mounting flange and the housing part. In this way gases have the possibility to escape through the gap. Porous weld seams can thus be avoided, since the gas does not have to pass the melt of the weld seam in order to escape.

The raised portion of the mounting flange advantageously extends axially along the housing part. This leads to a reliable positioning of the mounting flange, since a tilting of the mounting flange with respect to the axial direction is prevented. In particular, it is advantageous when the raised portion abuts the housing part approximately linearly, since in this way there is no formation of a bearing face between mounting flange and housing part.

The mounting flange is advantageously formed as a bent and stamped part. The production of the mounting flange from a sheet metal part by a cold-forming process allows a reliable and economical series production. Here, the raised portion is molded in one piece from the sheet metal part, such that no additional material has to be added in order to form the raised portion. Since the raised portion is shaped from the sheet metal part, the raised portion can be shaped advantageously during the cold-forming process of the sheet metal part, in particular by stamping, bending and/or embossing. There is thus no need for any postprocessing of the bent sheet metal part.

The housing part advantageously has a raised portion that extends axially along the housing part and that abuts the mounting flange, and in particular the raised portion abuts the mounting flange approximately linearly, which ensures a high weld seam quality in an economical manner.

The mounting flange has an annular collar, which surrounds the housing part in the peripheral direction in a closed manner or in portions, wherein the collar extends as a cuff axially along the housing. This advantageous design of the collar enables an exact alignment of the mounting flange with the housing part. The raised portion, which is shaped from the collar, ensures the advantageous formation of a gap between the collar and the housing part, wherein the gap extends in the peripheral direction and/or in the axial direction, such that there is sufficient space for the escape of the gases. A high weld seam quality is ensured in this way.

The collar expediently has a stamping burr at an axial end. A weld seam is advantageously applied to the stamping burr by means of laser welding. The stamping burr makes it possible to apply the weld seam exactly and reliably, since the stamping burr is an extension extending toward the housing part. More material for welding is therefore supplied for the weld seam, but without contacting the housing part. The mounting flange is thus mounted on the housing part with assurance of a high weld seam quality, since the gases produced during welding can escape.

The mounting flange is mounted on the housing part by means of at least one weld seam at least at one axial end of the collar. In addition, the collar may advantageously be mounted on the housing part by means of at least one lap weld seam, which is applied to a raised portion. Here, the welding tool is guided from the outside toward the raised portion, in particular radially relative to the peripheral direction, such that the finished lap weld seam extends radially from the sheet metal of the raised portion into the housing part. The application of weld seams to the raised portions and/or the collar offers a particularly secure fit of the mounting flange on the housing part, since tensile and shear forces are advantageously counteracted as a result. If the distance between the raised portions is selected to be smaller than a diameter of the housing part, the mounting flange may then be pre-fixed on the housing part. A reliable application of the weld seams can thus be ensured.

The collar has at least two raised portions, wherein the raised portions are separated from one another by an angle in the peripheral direction. An advantageous gap between collar and housing part can thus be produced reliably by means of a number of raised portions. Here, the weld seam extends at one end of the collar between the raised portions. Gas produced by the welding can thus be removed through the gap extending between the raised portions in the peripheral direction. At least one protrusion may preferably be arranged along the weld seam extending in the peripheral direction. Here, the weld seam may be closed in the peripheral direction. This offers an advantageous maximum strength of the connection between mounting flange and housing part.

The mounting flange at a radially inner collar edge at a first end and/or at a second end of the collar advantageously has a radius or a chamfer. An inner diameter of the collar which is arranged axially fully outwardly at the end thereof is thus greater than the inner diameter which is distanced further axially from the end. Here, the radius or the chamfer is also integrally molded on at least one axial end of the raised portion. A housing of the electric machine, which housing comprises the housing part, also has a radius or a chamfer at a radially outer housing edge. The integral molding of the radius or of the chamfer on the mounting flange and/or the housing advantageously facilitates the fitting of the mounting flange onto the housing. Damage to the coating of the flange and/or the housing can thus be avoided.

The mounting flange, in particular at the first end, has at least one radially outwardly extending extension, such that the extension is arranged transversely to the collar. Here, the extension has receptacles for screws, rivets and/or pins. The extension makes it possible to mount the mounting flange advantageously on an adjustment device, such as a gear actuator, or on the body. A band is preferably arranged between the collar and extension, wherein in particular the band and the extension lie in two different planes. This is achieved by offsetting the extension.

The advantageous electric machine having a mounting flange is used in motor vehicles as a servo motor, in an anti-lock braking system (ABS), in an electronic stability program (ESP) and/or as motor in a cooling system. Since the weld seams according to the invention are of advantageously good quality, the electric machine ensures a high operating reliability and an efficient function of a motor vehicle.

The method according to the invention has the advantage over the prior art that an economical and simple series production of an electric machine is made possible. The method according to the invention thus has the following advantageous steps, wherein the advantages thereof are mirrored in accordance with the same features of the device in the associated device advantages:

positioning a mounting flange on an electric machine, such that a collar having raised portions is arranged on a housing part, wherein only the raised portions abut the housing part applying at least one weld seam to at least one axial end of the collar and/or applying the weld seam to a raised portion of the mounting flange—wherein the weld seam is applied from the outside in particular radially relative to the peripheral direction.

The mounting flange is thus preferably mounted on the housing part by means of laser welding. By use of such welding processes, there is no need to supply additional material, for example in the form of wire, gas or powder as in the case of arc welding or gas-shielded welding. This leads to a simplification of the production process.

In an advantageous variation of the method the weld seam is embodied as a butt joint weld. In the butt joint weld the axial end of the mounting flange and of a housing are arranged flush. A melt produced by the welding process is drawn here completely between the collar and the housing part, for example by the capillary force or the force of gravity, without the melt protruding beyond the collar or the housing part in the axial direction. Thus, no bothersome bead-like weld seams remain, which have a disadvantageous effect on the installation of the electric machine. It is also possible to embody the weld seam as a fillet seam. In the case of the fillet seam the housing and/or the housing part protrudes beyond the axial end, or the axial end protrudes beyond the housing and/or the housing part in the axial direction. In the case of the fillet seam the melt is not completely drawn between the collar and the housing part, and the weld seam forms in a radius-like manner between the collar and the housing part. A maximum strength of the weld seam is thus achieved. Here, the fillet seam and the butt joint weld are formed in a convex and/or concave manner between the collar and the housing part. The weld seam can also be provided as a lap weld seam on the raised portion. The lap weld seam is characterized by an overlapping contact region between the housing part and the raised portion. The lap weld seam is applied from the outside to an overlapping contact region of the raised portion and the housing part. In this way, the linear contact region between the raised portion and the housing part is melted and the gases produced during this process can escape optimally into the adjacent gap.

In the case of laser welding a laser is advantageously pivoted about an angle with respect to a motor axis. The motor axis extends in the axial direction. Here, the laser beam and the motor axis form a welding angle from 10° to 90°, but preferably for a fillet seam from 30° to 40°. This method variation enables a precise and predictable embodiment of the weld seams.

The mounting flange is expediently produced from a cold-formed sheet metal part, which in particular is produced for the majority by means of a deep drawing process and/or a cutting process. Here, at least one raised portion is molded from the collar, such that the raised portion is formed in one piece with the mounting flange. The advantages of this method variant are the same as those of the corresponding device variant. The mounting flange and/or the housing part have a coating, which preferably contains tin, zinc, nickel, chromium or copper. The coating serves to prevent corrosion. Here, tin, zinc, nickel, chromium and copper can be applied to the mounting flange and/or the housing part or housing in an ideal manner by means of a galvanic method.

BRIEF DESCRIPTION OF THE DRAWINGS

Embodiments of the invention are illustrated in the drawings and are explained in greater detail in the following description.

In the drawings.

DETAILED DESCRIPTION

Figure 1:
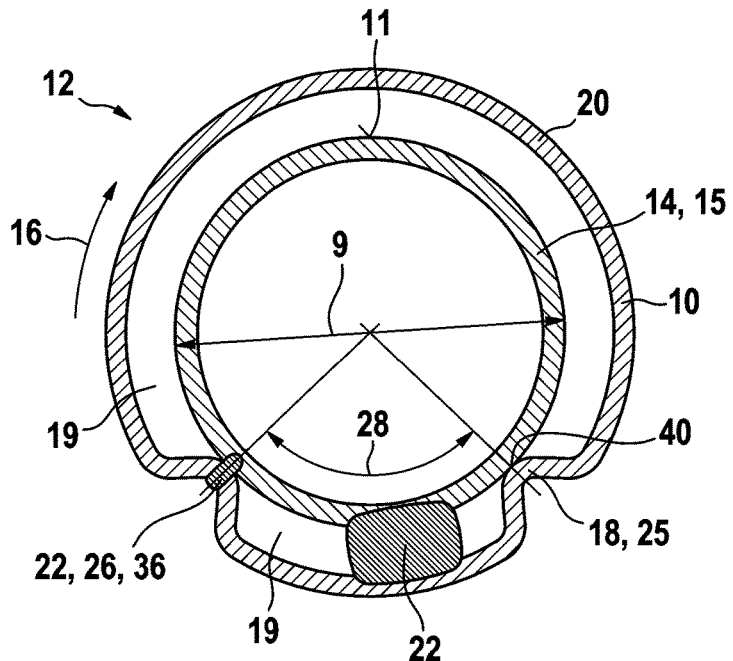
FIG. 1: shows a cross section of an electric machine according to the invention with welded-on mounting flange

In FIG. 1 an electric machine 12 having a mounting flange 10 is shown. The mounting flange 10 is arranged on a cylindrical housing part 14 of the electric machine 12. However, other forms of the housing are also conceivable, such as angular, box-shaped, polygonal or other forms, which meet the demands of a device to which the electric machine 12 is connected. The electric machine 12 also has a housing 15. The housing part 14 is part of the housing 15. An embodiment is possible in which the housing part 14 constitutes merely an axial portion of the housing 15. Here, the housing part 14 may be closed or open in the peripheral direction 16 of the electric machine 12, wherein the peripheral direction 16 fundamentally also includes a periphery of a non-circular cross-sectional area, for example of a rectangle, a polygon or another geometric shape. Variations of the cylindrical housing part 14 are possible which have a housing part diameter 9 equal to or greater or smaller than the housing diameter of the housing 15. In FIG. 1 the housing part 14 is illustrated as a circular pole-well of an electric machine 12, which for example is produced from a part deep drawn from a sheet metal. The mounting flange 10 surrounds the housing part 14 at least in portions in the peripheral direction 16. The mounting flange 10 and/or the housing part 14 are coated. The coating is at least a monolayer coating for this purpose and consists of at least one material. A possible coating contains tin, zinc, copper or chromium or a combination of these metals. The mounting flange 10 has at least one radially inwardly directed raised portion 18, wherein the raised portion 18 abuts a peripheral wall 11 of the housing part 14. Embodiments having a plurality of raised portions 18 are possible.

Figure 2:
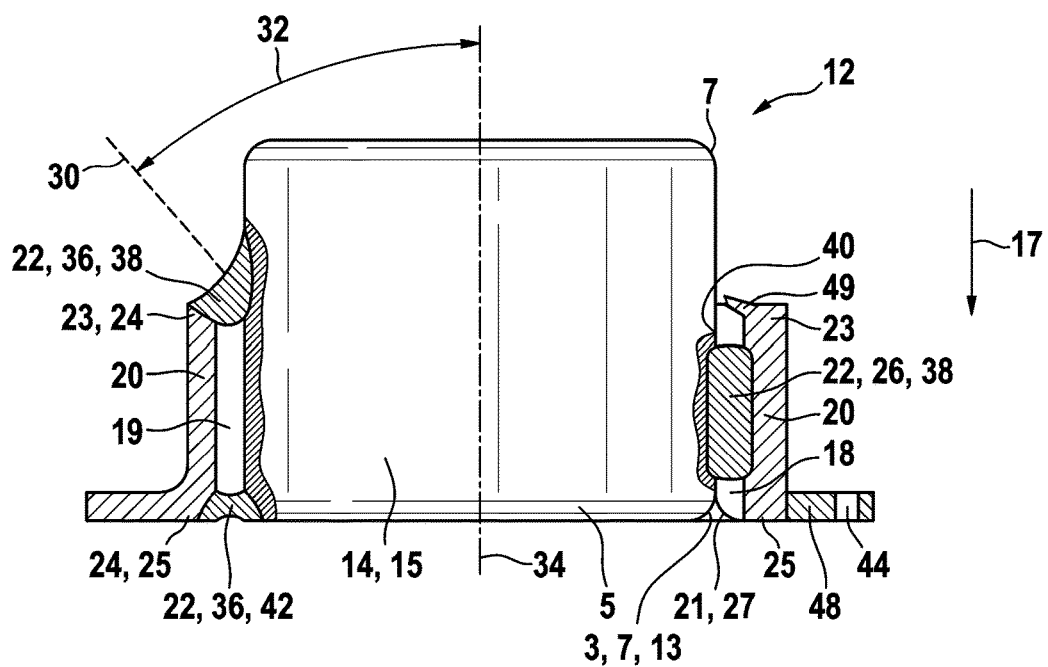
FIG. 2: shows a radial section of an electric machine according to the invention with welded-on mounting flange

The raised portion 18 of the mounting flange 10 extends axially along the housing part 14, and in particular the raised portion 18 abuts the housing part 14 approximately linearly. In a further embodiment the raised portion 18 is formed in a point-shaped manner and does not extend axially along a housing part 14. A bearing point between housing part 14 and raised portion 18 is thus formed approximately. A raised portion 18 that winds axially in a helical manner along the housing part 14 and accordingly abuts the housing part 14 in helical lines is also possible. The raised portion 18 extends along an axial direction 17, as is shown in FIG. 2. In FIG. 1 a cross section through the mounting flange 10 is illustrated, showing a U-shaped raised portion 18. Such a raised portion 18 may be formed as a press rib. Here, the protrusion 18 transitions in one piece into the mounting flange 10. The inwardly pointing radial apex of the raised portion 18 here abuts the peripheral wall 11 linearly. In principle, a raised portion 18 may also abut two or more housing parts 14. A further embodiment comprises raised portions 18 that abut the housing part 14 in a planar manner.

The mounting flange 10 is produced from a cold-formed, for example punched, bent and deep drawn, sheet metal part. Whereas the sheet metal part for example is deep drawn to form the mounting flange 10, the raised portion 18 is likewise shaped in one piece from the sheet metal part by a plastic forming process 18. Here, the raised portion 18 and the mounting flange 10 can be produced by means of the same tool. The raised portion 18 may be formed in different ways. A form of the raised portion 18 in which, following the production of the raised portion 18, the sheet metal part from which said raised portion is formed has no hole is thus possible. Such a raised portion 18 is formed from the sheet metal part in a bulge-shaped or wave-shaped manner. A further embodiment is possible in which the raised portion 18 is cut out from the sheet metal part, such that the sheet metal parts is still connected in one piece to the raised portion 18 at least at one location and the sheet metal part has at least one hole. The mounting flange 10 may also be produced at least in part by machining.

The mounting flange 10 also has a circular collar 20, which completely surrounds the housing part 14 in the peripheral direction 16. An embodiment in which the collar 20 does not surround the housing part 14 completely is also conceivable. Here, the collar 20 extends at least in portions axially along the housing part 14. The raised portion 18 is shaped from the collar 20. A radial gap 19 is formed between the collar 20 and the housing part 14, wherein the gap 19 extends in the peripheral direction 16 and in the axial direction 17. In an embodiment with a plurality of raised portions 18, the gap 19 surrounds the housing part 14 from a first raised portion 18 to a second raised portion 18. A variant is possible in which the gap 19 is not formed axially continuously. The radial extension of the raised portions 18 determines the radial size of the gap 19. The size of the gap is thus between 0.01 mm to 0.25 mm, preferably between 0.02 mm to 0.15 mm.

The mounting flange 10 is mounted on the housing part 14 by means of a welding process, such as laser welding and/or resistance welding.

The mounting flange 10 is mounted on the housing part 14 by means of at least one weld seam 22 at least at one axial end 24 of the collar 20. Here, the weld seam 22 extends between the collar 20 and the housing part 14. The collar 20 and the housing part 14 are connected to one another in an integrally bonded manner. In accordance with a further embodiment at least one lap weld seam 26 is provided. The lap weld seam 26 sits on an overlapping contact region 40, which is characterized in that the raised portion 18 and the housing part 14 overlap and at the same time contact one another. Here, lap weld seams 26 may supplement or replace the weld seams 22 at the axial ends. The lap weld seams 26 are applied from the outside to a raised portion 18, in particular radially relative to the peripheral direction 16. Here, the lap weld seam 26 is formed from a sheet metal 25 of the raised portion 18 radially inwardly into the housing part 14, such that an integrally bonded connection is produced between the raised portion 18 and the housing part 14. The mounting flange 10 is thus fixed on the electric machine 12.

The collar 20 in a preferred variant has at least two raised portions 18. The raised portions 18 are separated from one another by an angle 28 in the peripheral direction 16. In FIG. 2 it is shown how the weld seam 22 extends at one end 24 of the collar 20 between the raised portions 18 in the peripheral direction 16. Alternatively, at least one raised portion 18 is arranged along the weld seam 22 in the peripheral direction 16, transversely to the weld seam 22. The weld seam 22 is preferably closed in the peripheral direction 16. The weld seam 22 may also be arranged along the contact region 40 between the raised portion 18 and the housing part 14 in the axial direction 17.

In FIG. 2 the mounting flange 10 is shown, wherein this has, at a radially inner collar edge 27 at a first end 25 of the collar 20, which is shown in FIG. 1, a radius 21 or a chamfer-shaped flattening, which serves as an insertion phase for the fitting of the mounting flange 10 onto the housing part 14. Radially inwardly there is thus no corner and no stamping burr 49 present at the end 25. An embodiment is possible in which only one end 25 has a radius of 21 and/or chamfer-shaped flattening, such that the stamping burr 49 is retained at the axially opposite end 23, 24. The stamping burr 49 protrudes radially inwardly from the collar 20. The stamping burr 49 may additionally also protrude axially from the end 24. If the stamping burr 49 is thus arranged at a shorter distance from the peripheral wall 11 than the collar 20. The weld seam 22 is then preferably formed on the stamping burr 49, along the gap 19 in the peripheral direction 16. It is also conceivable for the radius 21 to extend at least in portions as far as a radially outer collar edge 27 at one of the ends 23, 25. The radius 21 or a chamfer-shaped flattening is also integrally molded on at least one axial end of the raised portion 18. A housing 15 of the electric machine 12 also has a radius 7 or a chamfer on a radially outer housing edge 13. It is also possible for the housing part 14 to have a radius 21 or a chamfer.

Figure 3:
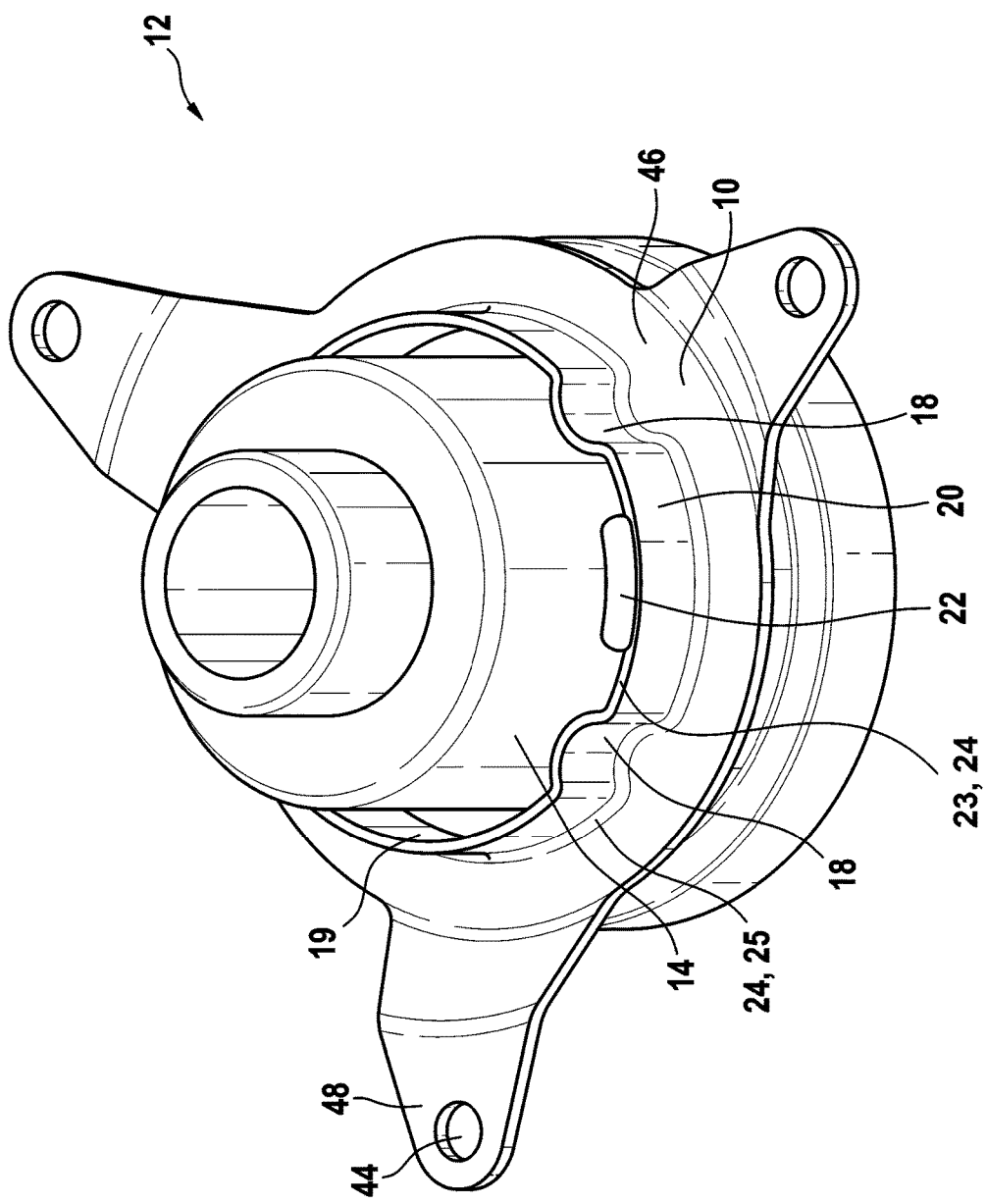
FIG. 3: shows an electric machine with arranged mounting flange

In FIG. 3 an electric machine 12 is shown, which has a mounting flange 10 having, at a first end 25, at least one radially outwardly extending extension 48. The extension 48 is arranged transversely to a collar 20. The collar is formed as in FIG. 2 and also has the raised portions 18, which abut a housing part 14 of the electric machine. The advantageous gap 19 between collar 20 and housing part 14 is thus formed. In accordance with the invention the weld seam 22 may thus be applied to an axial end of 23, 24 of the mounting flange 10 between the raised portions 18. Here, the weld seam 22 does not extend as far as the raised portion 18, but ends before it contacts the raised portions 18. The extension 48 has receptacles 44 for connection elements. A further embodiment preferably has a band 46 between collar 20 and extension 48. The band 46 and the extension 48 lie in two different axial planes. In order to achieve this, the extension 48 is offset. Alternatively, the band 46 has an offset. The housing 15 may be produced as a deep drawn part and may constitute the pole-well of an electric machine 12.

The electric machine 12 having a mounting flange 10 is used in cars as a servo motor, in ABS, in ESP and/or as a motor in a cooling system. Here, the electric machine 12 is used in particular as a servo motor in electrically adjustable transmissions. However, the electric machine 12 is not limited to such applications. The electric machine 12 is preferably also embodied as an electrically commutated machine, but can also be embodied as a mechanically commutated machine.

In a preferred embodiment the method comprises the following steps:

Positioning a mounting flange 10 on an electric machine 12. The positioning may be performed by a machine or by hand. In this way, a collar 20 having raised portions 18 is arranged on a housing part 14, wherein the raised portions 18 abut the housing part 14. Here, different designs of the raised portions 18 corresponding to the previously described device features are possible. Here, the raised portions 18 center the housing part 14 in the mounting flange 10. If the distance between the raised portions 18 is selected to be smaller than the diameter 9 of the housing part 14, the mounting flange can be pre-fixed on the housing part 14.

Applying at least one weld seam 22, 38, 42 to at least one axial end 23, 24, 52 of the collar 20.

The weld seam 22, 26, 38 may also be arranged on a raised portion 18 of the mounting flange 10, in accordance with the previous device features. The weld seam 22, 26 is applied to the raised portion 18 from the outside, in particular radially relative to the peripheral direction 16, such that a welding tool is not guided toward the housing part 14, but instead a sheet metal 25 of the raised portion 18 is located between the housing part 14 and welding tool. With this approach the welding tool welds through a sheet metal 25 of the mounting flange 10, which forms the raised portion 18, and connects the raised portion 18 to the housing part 14. Here, a melt 36 of the sheet metal 25 produced by the welding must combine with the melt 36 of the housing part 14.

The mounting flange 10 is mounted on the housing part 14 by means of a welding process, such as laser welding and/or resistance welding. In a preferred embodiment the welding is performed in a fully automated process.

In the variant as shown in FIG. 2 the weld seam 22 is a butt joint seam 42, in which a melt 36 produced by the welding method is drawn completely between the collar 20 and the housing part 14 without the melt 36 protruding beyond the collar 20 or the housing part 14 in the axial direction 17. In order to produce a butt joint seam 42, an axial end 24 of the mounting flange 10 must lie in the axial direction 17 directly at an axial end 5 of the housing 15, i.e. must be flush. A variant in which the weld seam at 22 is a fillet seam 38 is also possible, in which case the melt 36 is formed in a radius-shaped manner between the collar 20 and the housing part 14 and is not drawn completely between the collar 20 and the housing part 14. For this purpose, the housing part 14 must protrude axially beyond one of the axial ends 24, as can be seen in FIG. 2. Alternatively, the weld seam 22 is a lap weld seam 26, in which case the lap weld seam 26 is applied externally to an overlapping contact region 40 of the raised portion 18 and of the housing part 14.

Laser welding is preferably used, as shown in FIG. 2. Here, a laser 30 is tilted with respect to a motor axis 34, which extends in the axial direction 17. The laser 30 thus preferably encloses a welding angle 32 with the motor axis 34 from 10° to 80°. In order to produce the fillet seam 38, the laser is set to an angle 32 from 30° to 40°. For a lap weld seam 26, the laser 30 is set to an angle 32 from 70° to 90°, and for a butt joint seam 42 is set to an angle 32 from 0° to 20°. Here, the angle is 0° when the laser is exactly aligned with the motor axis 34.

It should be noted that, with respect to the exemplary embodiments presented in the figures and in the description, a large number of options for the combination of the individual features with one another are possible.

The invention claimed is:

1. An electric machine (12) having a mounting flange (10), wherein the mounting flange (10) is arranged on a housing part (14) of the electric machine (12) in such a way that the mounting flange (10) at least in portions surrounds the housing part (14) in a peripheral direction (16) of the housing part (14), wherein at least one of the mounting flange (10) and the housing part (14) is coated, characterized in that the mounting flange (10) has at least one radially directed raised portion (18), which abuts the housing part (14), wherein the mounting flange (10) is mounted on the housing part (14) by a welding process.

2. The electric machine (12) as claimed in claim 1, characterized in that the raised portion (18) of the mounting flange (10) extends axially along the housing part (14).

3. The electric machine (12) as claimed in claim 1, characterized in that the mounting flange (10) is produced from a sheet metal part, wherein the raised portion (18) is formed in one piece from the sheet metal part.

4. The electric machine (12) as claimed in claim 1, characterized in that the housing part (14) has a raised portion, which extends axially along the housing part (14) and which abuts the mounting flange (10).

5. The electric machine (12) as claimed in claim 1, characterized in that the mounting flange (10) has a circular collar (20), which surrounds the housing part (14) in the peripheral direction (16), wherein the collar (20) extends at least in portions axially along the housing (14), and the raised portion (18) is formed from the collar (20), and in that a radial gap (19) is formed between the collar (20) and the housing part (14), wherein the gap (19) extends in the peripheral direction (16) and in the axial direction (17).

6. The electric machine (12) as claimed in claim 5, characterized in that a stamping burr (49) is integrally molded on an axial end (24) of the collar (20), to which stamping burr a weld seam (22) is applied by laser welding, whereby the mounting flange (10) is mounted on the housing part (14).

7. The electric machine (12) as claimed in claim 5, characterized in that the mounting flange (10) is mounted on the housing part (14) by at least one lap weld seam (26), which is applied to a raised portion (18).

8. The electric machine (12) as claimed in claim 7, characterized in that the collar (20) has at least two raised portions (18) separated from one another in the peripheral direction (16) by an angle (28), and the weld seam (22) extends between the two raised portions (18) at an axial end (24) of the collar (20).

9. The electric machine (12) as claimed in claim 5, characterized in that the mounting flange (10) has, radially inwardly at one end (24) of the collar (20), a radius (21) or a chamfer-shaped flattening.

10. The electric machine (12) as claimed in claim 5, characterized in that the mounting flange (10) has, at a first end (25), at least one radially outwardly extending extension (48), such that the extension (48) is arranged transversely to the collar (20), wherein the extension (48) has receptacles (44) for connection elements.

11. The electric machine (12) as claimed in claim 5, characterized in that the collar (20) has at least two raised portions (18) separated from one another in the peripheral direction (16) by an angle (28), and a weld seam (22) extends between the two raised portions (18) at an axial end (24) of the collar (20), and the weld seam (22) closed in the peripheral direction (16).

12. The electric machine (12) as claimed in claim 5, characterized in that the mounting flange (10) has, at the first end (25), at least one radially outwardly extending extension (44), such that the extension (48) is arranged transversely to the collar (20), wherein the extension (48) has receptacles (44) for connection elements, wherein a band (46) is arranged between the collar (20) and extension (48), and the band (46) and the extension (48) lie in two different axial planes, wherein the extension (48) is offset.

13. The electric machine (12) as claimed in claim 1, characterized in that the raised portion (18) of the mounting flange (10) extends axially along the housing part (14), and in that the raised portion (18) abuts the housing part (14) approximately linearly.

14. The electric machine (12) as claimed in claim 1, characterized in that the mounting flange (10) is produced from a sheet metal part, which is cold-formed, wherein the raised portion (18) is formed in one piece from the sheet metal part.

15. The electric machine (12) as claimed in claim 1, characterized in that the mounting flange (10) is mounted on the housing part (14) by means of at least one lap weld seam (26), which is applied to a raised portion (18) radially from the outside.

16. The electric machine (12) as claimed in claim 1, characterized in that a housing (15) of the electric machine (12) has, on a radially outer edge (13), a radius or a chamfer-shaped flattening, which serve as axial insertion aids.

17. A method for producing an electric machine (12) having a mounting flange (10), the method comprising Positioning the mounting flange (10) on a peripheral wall (11) of the electric machine (12), such that a collar (20) of the mounting flange (10) abuts a peripheral wall (11) radially by means of raised portions (18), and Applying at least one weld seam (22, 38, 42) to at least one axial end (23, 24, 52) of the collar (20).

18. The method as claimed in claim 17, characterized in that the mounting flange (10) is mounted on a housing part (14) of the electric machine (12) by laser welding, and the weld seam (22) is formed in a peripheral direction (17) at an axial end (23, 24, 25) of the collar (20).

19. The method as claimed in claim 18, characterized in that, for the laser welding, a laser (30) encloses a welding angle (32) from 10° to 80° relative to a motor axis (34) which extends in the axial direction (17).

20. The method as claimed in claim 18, characterized in that, for the laser welding, a laser (30) encloses a welding angle (32) from 30° to 50°, relative to a motor axis (34) which extends in the axial direction (17).

21. The method as claimed in claim 17, characterized in that the weld seam (22) is at least one of the following: a butt joint seam (42), which is welded on at an axial end (24) of the collar (20); a fillet seam (38), which is welded on at an axial end (24) of the collar (20); and a lap weld seam (26), which is welded on at an overlapping region of the collar (20) and of the housing part (14).

22. The method as claimed in claim 17, characterized in that the mounting flange (10) is a cold-formed sheet metal part, which is produced by a deep drawing method, wherein at least one raised portion (18) is formed in one piece with the mounting flange (10), wherein at least one of the mounting flange (10) and the housing part (14) has a coating which contains tin, zinc, nickel, chromium or copper.

* * * * *